United States Patent
Gong (10) Patent No.: US 8,457,445 B2
(45) Date of Patent: Jun. 4, 2013

(54) IMAGE-SCALING-DOWN METHOD AND IMAGE PROCESSING APPARATUS

(75) Inventor: Jin-Sheng Gong, Hsin Chu (TW)

(73) Assignee: Realtek Semiconductor Corp., Hsinchu (TW)

(*) Notice: Subject to any disclaimer, the term of this patent is extended or adjusted under 35 U.S.C. 154(b) by 626 days.

(21) Appl. No.: 12/691,254

(22) Filed: Jan. 21, 2010

(65) Prior Publication Data
US 2010/0183244 A1    Jul. 22, 2010

(30) Foreign Application Priority Data
Jan. 22, 2009   (TW) .............................. 98102346 A (51) Int. Cl.
G06K 9/32      (2006.01)

(52) U.S. Cl.
USPC ......................................................... 382/298

(58) Field of Classification Search
USPC .............. 345/472.1; 348/387.1, 390.1, 420.1, 348/421.1, E7.006; 375/240.24, E7.075, 375/E7.136, E7.148, E7.17, E7.176, E7.18, 375/E7.19, E7.223, E7.266; 382/298; 386/E5.013, E9.013, E9.02; 707/E17.002
See application file for complete search history.

(56) References Cited

U.S. PATENT DOCUMENTS
2005/0190982 A1* 9/2005 Tsumura ...................... 382/250
2008/0253457 A1* 10/2008 Moore ..................... 375/240.16

FOREIGN PATENT DOCUMENTS
| CN | 1484434 A | 3/2004 |
| CN | 1886758 A | 12/2006 |
| CN | 1946133 A | 4/2007 |

* cited by examiner

Primary Examiner — Gregory F Cunningham
(74) Attorney, Agent, or Firm — Muncy, Geissler, Olds & Lowe, PLLC (57) ABSTRACT

An image-scaling-down method for scaling down a pixel block of an image component is provided. The pixel block includes a plurality of sub-blocks and each sub-block includes m number of non-processed pixel data where m is a positive integer. The image-scaling-down method comprises: determining a scaling down factor wherein m divided by n is the scaling down factor and n is a positive integer less than m; and calculating n number of processed pixel data in each sub-block by using the scaling down factor and the m number of the non-processed pixel data, wherein the combination of the n number of the processed pixel data of the sub-blocks corresponds to the image component.

11 Claims, 8 Drawing Sheets

IMAGE-SCALING-DOWN METHOD AND IMAGE PROCESSING APPARATUS

BACKGROUND OF THE INVENTION (a) Field of the Invention

The invention relates to an image-scaling-down method and an image processing apparatus, particularly to an image-scaling-down method and an image processing apparatus which reduce the number of pixel data of a pixel block.

(b) Description of the Related Art

Figure 1:
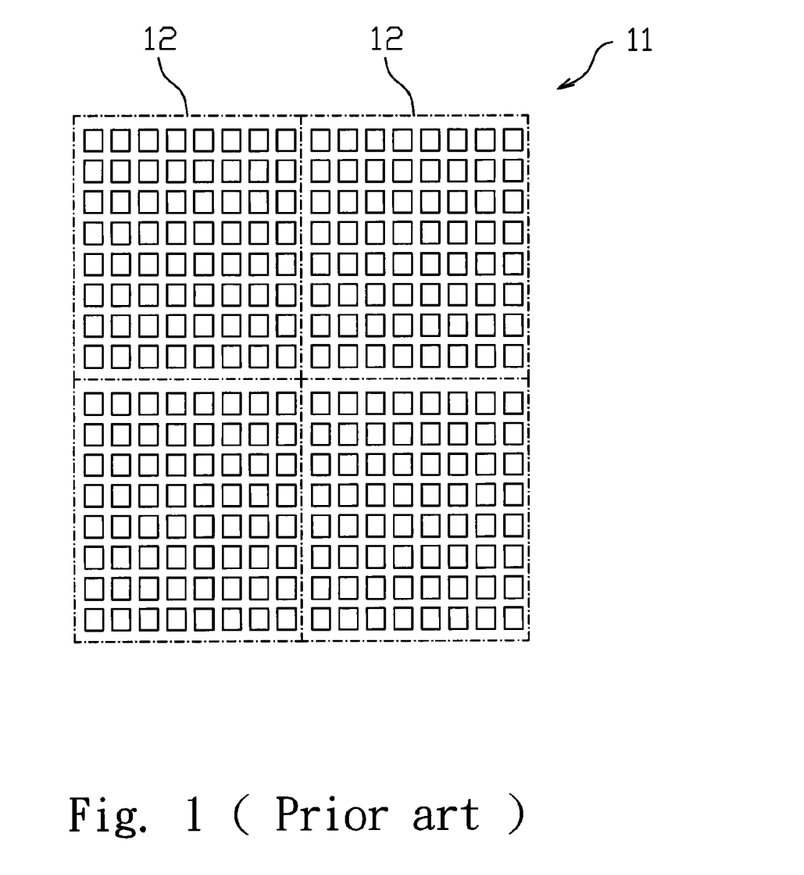
FIG. 1 shows a schematic diagram illustrating a portion of an image comprising four pixel blocks.

Generally, in a display device like a digital picture frame or television equipped with an image decoder for displaying the image corresponding to compressed image data with a format like JPEG, GIF, etc., at least one memory is needed to temporarily store the decoded image data and then the display device accesses the decoded image data stored in the memory for displaying this image. FIG. 1 schematically shows a portion of an image 11 including four pixel blocks 12. As shown in FIG. 1, the image compression technique utilizing the JPEG format treats each 8×8 pixel block 12 as one unit to perform compression and also treats each 8×8 pixel block 12 as one unit during decoding.

In the prior art, after the display device decodes the compressed image data, the decoded image data will be stored in a memory. As the image corresponding to the decoded image data has 10,000,000 pixels, the memory has to have the capacity of 10 M×3 bytes, that is, 30 MB. In addition, as the display device can only display a 1920×1080 image with 2,000,000 pixels, the display device according to the prior art has to convert the decoded image data into an output image data corresponding to the image with 2,000,000 pixels. Therefore, according to the prior art, the capacity of the required memory is relatively large and the capacity of the memory is wasted.

BRIEF SUMMARY OF THE INVENTION

In light of the above-mentioned problems, one object of the invention is to provide an image-scaling-down method and an image processing apparatus for scaling down a pixel block of an image component. One object of the invention is to provide an image processing apparatus that does not need a memory to temporarily store the decoded image data decoded by the decoder so as to reduce production cost.

One embodiment of the invention provides an image-scaling-down method for scaling down a pixel block of an image component. The pixel block includes a plurality of sub-blocks and each sub-block includes m number of non-processed pixel data where m is a positive integer. The method comprises: determining a scaling down factor wherein m divided by n is the scaling down factor and n is a positive integer less than m; and calculating n number of processed pixel data in each sub-block by using the scaling down factor and the m number of the non-processed pixel data of each sub-block; wherein the combination of the n number of the processed pixel data of the sub-blocks corresponds to the image component.

According to one embodiment of the invention, in the above image-scaling-down method, the step of calculating n number of processed pixel data in each sub-block by using the scaling down factor and the m number of the non-processed pixel data of each sub-block comprises: calculating a scaling-down initial value by using the scaling down factor; calculating a plurality of pixel weights by using the scaling down factor and the scaling-down initial value; and calculating the n number of processed pixel data in each sub-block by using the pixel weights and the m number of the non-processed pixel data of each sub-block.

According to one embodiment of the invention, in the above image-scaling-down method, the step of calculating n number of processed pixel data in each sub-block by using the scaling down factor and the m number of the non-processed pixel data of each sub-block comprises: having the scaling down factor equal m divided by 2n if it is determined that m/2 is a positive integer and m divided by n is greater than 2; performing a downgrade operation on the m number of the non-processed pixel data of each sub-block to calculate m/2 number of temporary pixel data wherein the combination of the m/2 number of the temporary pixel data of the sub-blocks corresponds to the image component; and calculating the n number of processed pixel data in each sub-block by using the scaling down factor and the m/2 number of temporary pixel data.

According to one embodiment of the invention, an image processing apparatus applied in an image processing apparatus is suitable for processing an image component and comprises a storage device, an image decoder, and a scaling-down device. The storage device is to store the image component. The image decoder is coupled to the storage device for decoding the image component and generating a pixel block corresponding to the image component. The pixel block includes a plurality of sub-blocks and each sub-block includes m number of non-processed pixel data where m is a positive integer. The scaling-down device is coupled to the image decoder. The scaling-down device comprises a scaling down factor calculating unit and a pixel number scaling down device. The scaling down factor calculating unit is to determine a scaling down factor where m divided by n is the scaling down factor and n is a positive integer less than m. The pixel number scaling down device is to calculate n number of processed pixel data in each sub-block by using the scaling down factor and the m number of the non-processed pixel data of each sub-block. The combination of the n number of the processed pixel data of the sub-blocks corresponds to the image component.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction with respect to the drawings. Therefore, the wording related to direction is not used to limit the scope of the invention.

The following is an example using the image data with the JPEG (Joint Photographic Experts Group) compression format to illustrate an embodiment of the invention. It should be noted that the invention is not limited to the image data with the JPEG format and the image data with other format like MPEG (Moving Picture Experts Group) also is within the scope of the invention. One image component of an image constituted by the JPEG image file can be arranged as an 8×8 pixel block and the 8×8 pixel block includes 8×8 pixel data that are arranged as an 8×8 matrix. Thus, the 8×8 matrix comprises 8 rows of sub-blocks (horizontal sub-blocks) and each row comprises 8 pixel data; or the 8×8 matrix comprises 8 columns of sub-blocks (vertical sub-blocks) and each column comprises 8 pixel data. In addition, one 8×8 pixel block or more than two adjacent 8×8 pixel blocks can be combined into a macro block. It should be noted that this embodiment uses an 8×8 pixel block for illustration but it is not limited to the 8×8 pixel block. The technique and spirit of the invention can be applied to any size of the current or future type of pixel blocks.

Figure 2:
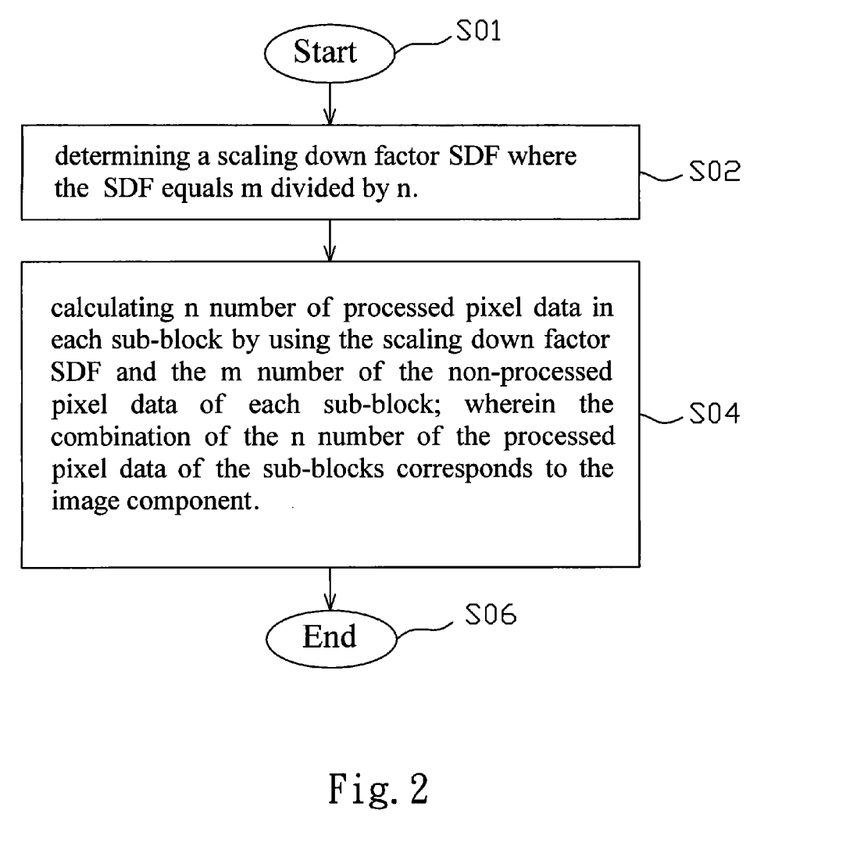
FIG. 2 shows a flow chart illustrating an image-scaling-down method according to one embodiment of the invention.

FIG. 2 shows a flow chart illustrating an image-scaling-down method according to one embodiment of the invention. The image-scaling-down method can be applied to scale down a pixel block of an image component. The pixel block includes a plurality of sub-blocks and each sub-block includes m number of non-processed pixel data where m is a positive integer. The image-scaling-down method according to this embodiment comprises the following steps:

Step S01: start;

Step S02: determining a scaling down factor (SDF) where m divided by n is the scaling down factor and n is a positive integer less than m; and Step S04: calculating n number of processed pixel data in each sub-block by using the scaling down factor SDF and the m number of the non-processed pixel data of each sub-block; wherein the combination of the n number of the processed pixel data of the sub-blocks corresponds to the image component. It should be noted that those who are skilled in the art can utilize the current technique or future technique to reduce the number of pixel data of a pixel block and thus the invention does not set the number of pixel data as a limitation. In one embodiment, the interpolation method can be used to reduce the number of pixel data of a pixel block.

Figure 3:
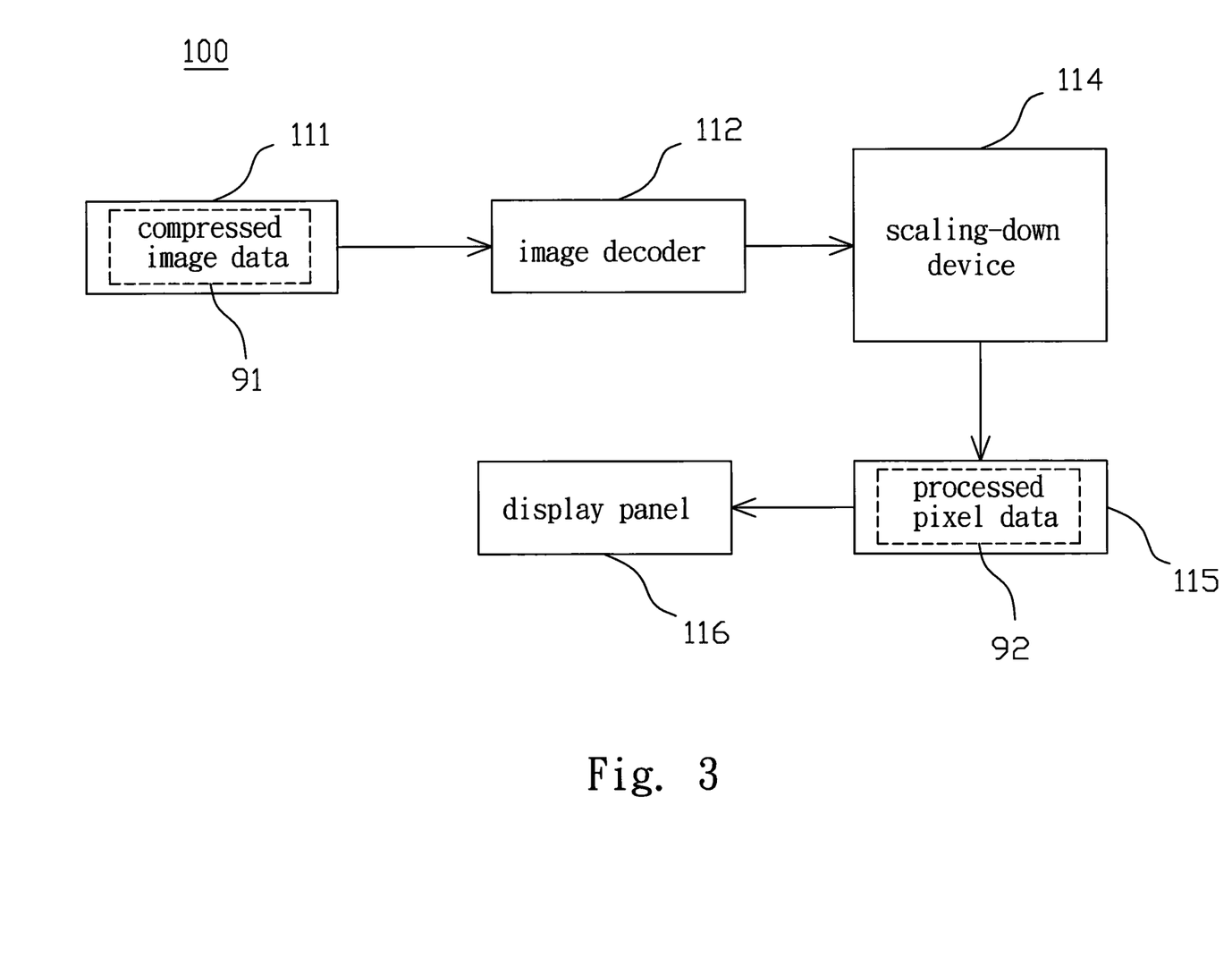
FIG. 3 shows a functional block diagram illustrating an image processing apparatus according to one embodiment of the invention.

In one embodiment, the linear interpolation method is used in calculation. That is, two pixel data before calculation are used to obtain one calculated pixel datum to reduce the number of pixel data of a pixel block. In the following, the JPEG image file stored in an image processing apparatus 100 of one display device is used as one example for illustration. FIG. 3 shows a functional block diagram of the image processing apparatus 100 according to one embodiment of the invention. The image processing apparatus 100 is disposed in a display device (not shown in the figure) and is suitable to process the image inputted into the display device for being displayed by the display panel (not shown in the figure) of the display device. The image processing apparatus 100 comprises a memory device, an image decoder 112, a scaling-down device 114, and a display panel 116. The memory device comprises a first memory 111 and a second memory 115. The first memory 111 is coupled to the image decoder 112 and stores a plurality of compressed image data 91 corresponding to one image component. The image component indicates a part of an image. The first memory 111 can be a memory card or a hard drive for storing a plurality of image files. Each image file comprises a plurality of image data corresponding to an image. For convenience, only a part of an image is used to illustrate the image-scaling-down method of this embodiment. The image decoder 112 is to decode the image component and generate a pixel block corresponding to the image component. In this embodiment, the image decoder 112 can be a JPEG decoder. Generally, the JPEG decoder outputs the image data via an 8×8 pixel block. Specifically, the 8×8 pixel block includes 8×8 non-processed pixel data that are arranged as an 8×8 matrix. In this embodiment, the non-processed pixel data indicate the image data that have not been processed by the scaling-down device 114. The scaling-down device 114 is coupled to the image decoder 112 and executes one image-scaling-down method. The second memory 115 is coupled to the scaling-down device 114 and is to store the processed pixel data 92. The display panel 116 is coupled to the second memory 115 and is to display the image component corresponding to the processed pixel data.

In the prior art, the pixel data of two or more than two pixel blocks are used in processing for different scaling-down factors. Therefore, one memory is required to temporarily store the decoded image data after decoded by the image decoder and then the decoded image data are scaled down. According to one embodiment of the invention, during the scaling-down operation, only the pixel data of one pixel block are used. That is, the pixel data in use are in one pixel block and do not cross two pixel blocks, and the scaling down factor of the pixel block is limited to be the n number of processed pixel data of one sub-block divided by the m number of non-processed pixel data of the sub-block, that is, n/m where n is a positive integer less than m. Therefore, the image processing apparatus 100 according to one embodiment of the invention does not need an additional memory to temporarily store the decoded image data and has the scaling-down device 114 be coupled to the image decoder 112 for receiving the pixel block outputted by the image decoder 112 and thereby scaling down the pixel block. Thus, the cost of memory can be reduced.

Figure 4A:
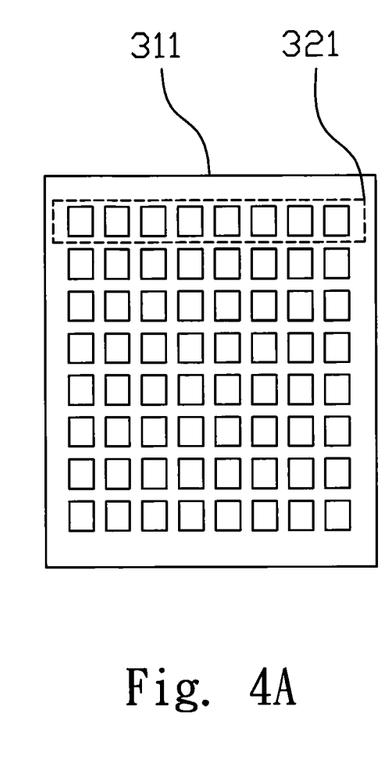
FIG. 4A shows a schematic diagram illustrating a pixel block according to one embodiment of the invention.
Figure 4B:
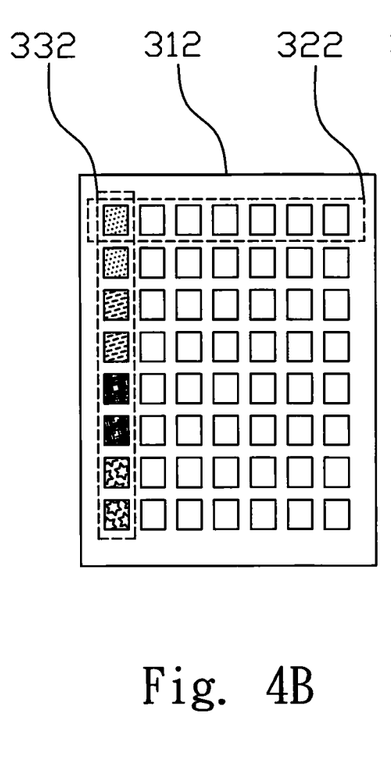
FIG. 4B shows a schematic diagram illustrating the pixel block shown in FIG. 4A after being scaled down in the horizontal direction.
Figure 4C:
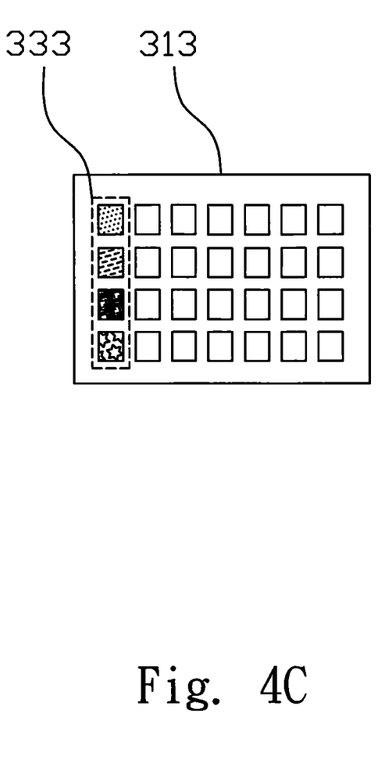
FIG. 4C shows a schematic diagram illustrating the pixel block shown in FIG. 4B after being scaled down in the vertical direction.

FIG. 4A shows a schematic diagram illustrating an 8×8 pixel block 311 consisted of 8×8 pixel data. FIG. 4B shows that the 8×8 pixel block 311 in FIG. 4A is scaled down in the horizontal direction by a ratio of 7/8 to become an 8×7 pixel block 312. FIG. 4C shows that the 8×8 pixel block in FIG. 4B is scaled down in the vertical direction by a ratio of 4/8 to become a 4×7 pixel block 313. The 8×8 pixel block 311 can be divided into 8 rows of horizontal sub-blocks 321. The 8×7 pixel block 312 can be divided into 8 rows of horizontal sub-blocks 322; or divided into 7 columns of vertical sub-blocks 332. The 4×7 pixel block 313 can be divided into 7 columns of vertical sub-blocks 333. After each horizontal sub-block 321 having 8 pixel data and each vertical sub-block 332 having 8 pixel data are scaled down by 7/8 and 4/8, respectively, the horizontal sub-block 322 having 7 pixel data and the vertical sub-block 333 having 4 pixel data are formed.

Figure 5:
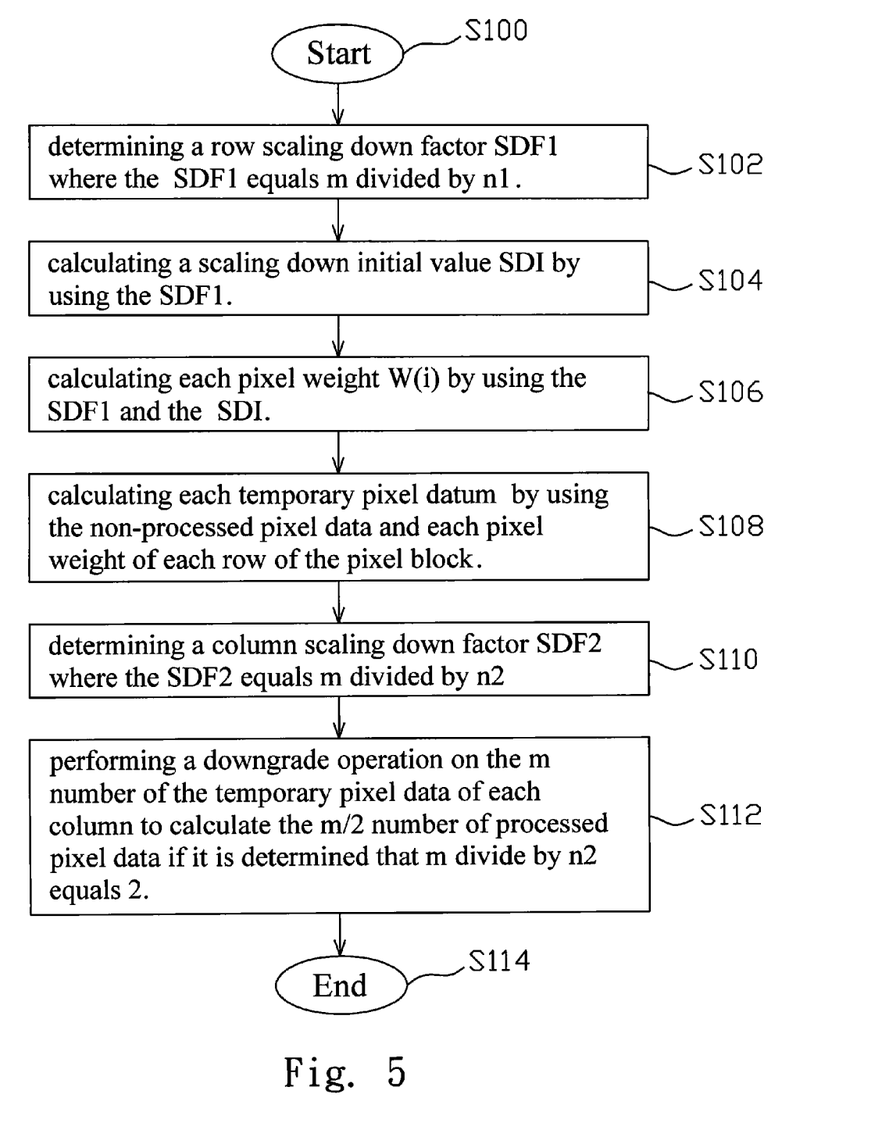
FIG. 5 shows a flow chart illustrating an image-scaling-down method according to one embodiment of the invention.

FIG. 5 shows a flow chart illustrating an image-scaling-down method according to one embodiment of the invention. Referring to FIGS. 4A-4C and FIG. 5, the image-scaling-down method executed by the scaling-down device 114 comprises the following steps.

Step S100: start.

Step S102: determining a row scaling down factor SDF1 where the row scaling down factor SDF1 equals m divided by n1 and n1 is a positive integer less than m. In this embodiment, m is the number of pixel data of each row of the pixel block 311 inputted to the scaling-down device 114. The image decoder 112 is a JPEG decoder and thus m equals 8 in this embodiment. n1 is the number of pixel data of each row of the pixel block 312 outputted by the scaling-down device 114. For the case of scaling down by a ratio of 7/8, n1 equals 7. m and n1 satisfy the following relationship shown by Eq1.

$$SDF1 = \frac{m}{n1} \qquad \text{Eq 1}$$

Step S104: calculating a scaling down initial value SDI by using the row scaling down factor SDF1. Specifically, the row scaling down factor SDF1 and the scaling down initial value SDI should satisfy the following relationship shown Eq2.

$$SDI = \left(\frac{SDF1 - 1}{2}\right) \qquad \text{Eq 2}$$

Step S106: calculating each pixel weight W(i) by using the row scaling down factor SDF1 and the scaling down initial value SDI where i is a positive integer less than or equal to n1. Specifically, each pixel weight W(i), the row scaling down factor SDF1 and the scaling down initial value SDI should satisfy the relationship shown by Eq3 where i is a positive integer less than or equal to n1.

$$W(i) = SDI + (SDF1 - 1) \times (i - 1) \qquad \text{Eq 3}$$

Step S108: calculating each temporary pixel datum Temp(1), Temp(2), ..., Temp(n1) by using the non-processed pixel data Pin(1), Pin(2), ..., Pin(n1), Pin(n1+1) and each pixel weight W(1), W(2), ..., W(n1) of each row of the pixel block 311 so that the calculated temporary pixel data is arranged as one m×n1 matrix. Specifically, the non-processed pixel data Pin(i) and Pin(i+1), the pixel weight W(i), and the temporary pixel datum Temp(i) satisfy the following relationship shown by Eq4.

$$\text{Temp}(i) = \text{Pin}(i) \times (1 - W(i)) + \text{Pin}(i+1) \times W(i) \qquad \text{Eq 4}$$

Referring to the following equations (1)~(4), as m is 8 and n1 is 7, the row scaling down factor SDF1 is 8/7; the scaling down initial value SDI is 1/14; and the pixel weights W(1) and W(2) are 1/14 and 3/14, respectively. The following equations (5) and (6) are used to obtain the temporary pixel data Temp(1) and Temp(2). Other temporary pixel data not shown in the example can be derived by those who are skilled in the art according to the above explanation. Thus, the details are omitted herein.

$$SDF = \frac{m}{n} = \frac{8}{7} \qquad (1)$$

$$SDI = \left(\frac{SDF - 1}{2}\right) = \left(\frac{8/7 - 1}{2}\right) = \frac{1}{14} \qquad (2)$$

$$W(1) = \frac{1}{14} + \left(\frac{8}{7} - 1\right) \times (1 - 1) = \frac{1}{14} \qquad (3)$$

$$W(2) = \frac{1}{14} + \left(\frac{8}{7} - 1\right) \times (2 - 1) = \frac{3}{14} \qquad (4)$$

$$\text{Temp}(1) = \text{Pin}(1) \times \left(1 - \frac{1}{14}\right) + \text{Pin}(2) \times \frac{1}{14} \qquad (5)$$
$$= \text{Pin}(1) \times \frac{13}{14} + \text{Pin}(2) \times \frac{1}{14}$$

$$\text{Temp}(2) = \text{Pin}(2) \times \left(1 - \frac{3}{14}\right) + \text{Pin}(3) \times \frac{3}{14} \qquad (6)$$
$$= \text{Pin}(2) \times \frac{11}{14} + \text{Pin}(3) \times \frac{3}{14}$$

Step S110: determining a column scaling down factor SDF2 where the column scaling down factor SDF2 equals m divided by n2 and n2 is a positive integer less than m.

Step S112: performing a downgrade operation on the m number of the temporary pixel data of each column to calculate the m/2 number of processed pixel data if it is determined that m divide by n2 equals 2. The downgrade operation is to reduce the m number of pixel data to m/2 number of processed pixel data and the sum of any two pixel data in the m number of pixel data divided by 2 is used to calculate one processed pixel datum in the m/2 number of processed pixel data after the downgrade operation. In this embodiment, by using the temporary pixel data Temp(1), Temp(2), ..., Temp(2i−1), Temp(2i) and the following equation Eq5, each processed pixel datum Pout(1), Pout(2), ..., Pout(i) can be obtained where i is a positive integer less than or equal to n2.

$$\text{Pout}(i) = \frac{(\text{Temp}(2i - 1) + \text{Temp}(2i))}{2} \qquad \text{Eq 5}$$

The scaling-down device 114 needs to do multiplication while using the equation Eq4. Since the scaling-down device 114 does calculation via the binary numeration system, the value of Pout(i) can be calculated by shifting the binary value of the sum of Temp(2i−1) and Temp(2i) so that multiplication can be omitted while the equation Eq5 is used in calculation. Therefore, as the number of pixel data of a sub-block is reduced to one half, the downgrade operation is used to increase the processing speed of the image-scaling-down method. The shifting method can be understood by those who are skilled in the art and thus its details will not be given herein.

Step S190: end.

In this embodiment, two pixel data before calculation and one predetermined relationship are used to obtain one calculated pixel datum. Thus, as the number of pixel data of one sub-block is reduced to less than one half, image aliasing occurs. The downgrade operation is used to reduce the number of pixel data of one sub-block to one half and then the corresponding scaling down ratio is carried out so that image aliasing can be reduced.

Figure 6:
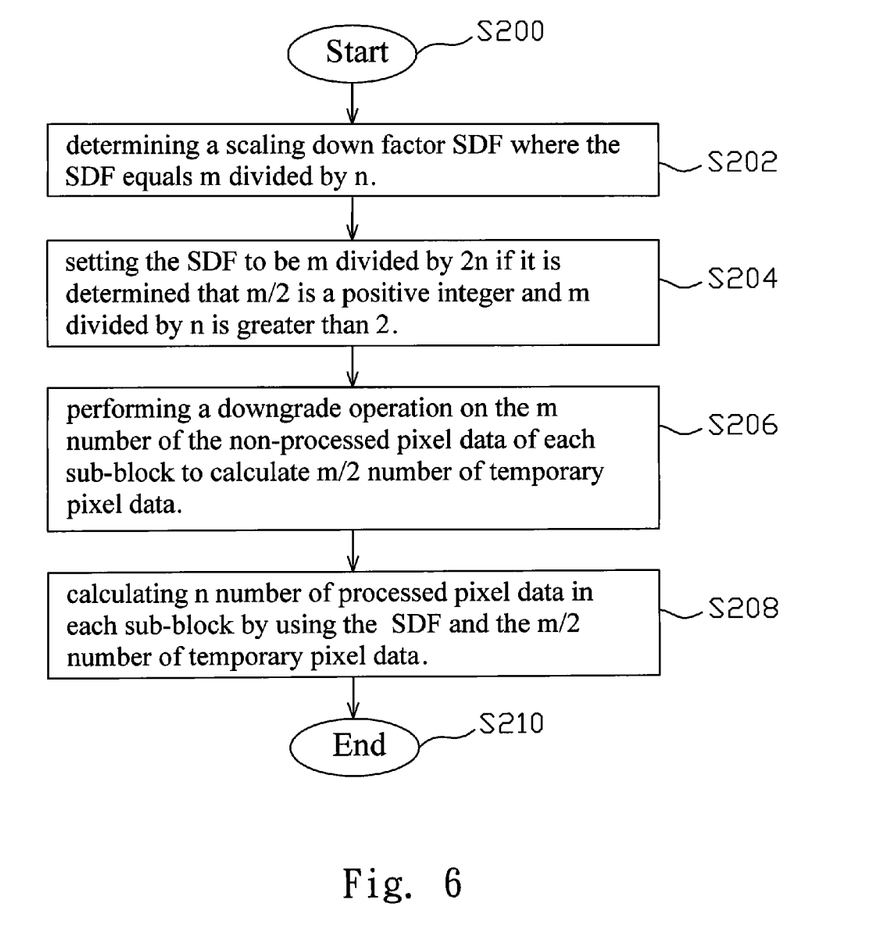
FIG. 6 shows a flow chart illustrating an image-scaling-down method according to one embodiment of the invention.

FIG. 6 shows a flow chart illustrating an image-scaling-down method according to one embodiment of the invention.

Referring to FIG. 6, the image-scaling-down method executed by the scaling-down device 114 comprises the following steps.

Step S200: start.

Step S202: determining a scaling down factor SDF where the scaling down factor SDF equals m divided by n and n is a positive integer less than m.

Step S204: setting the scaling down factor SDF to be m divided by 2n if it is determined that m/2 is a positive integer and m divided by n is greater than 2.

Step S206: performing a downgrade operation on the m number of the non-processed pixel data of each sub-block to calculate m/2 number of temporary pixel data wherein the combination of the m/2 number of the temporary pixel data of the sub-blocks corresponds to the image component.

Step S208: calculating n number of processed pixel data in each sub-block by using the scaling down factor SDF and the m/2 number of temporary pixel data wherein the combination of the n number of processed pixel data corresponds to the image component.

Step S290: end.

For example, as a horizontal sub-block 321 having 8 pixel data is to be scaled down by a ratio of 3/8 to become a horizontal sub-block 322 having 3 pixel data, the horizontal sub-block 321 having 8 pixel data is processed by the downgrade operation to be scaled down by a ratio of 1/2 and then the horizontal sub-block 322a (not shown) having 4 pixel data is formed. The horizontal sub-block 322a having 4 pixel data is scaled down by a ratio of 3/4 to become the horizontal sub-block 322 having 3 pixel data. As a horizontal sub-block 321 having 8 pixel data is to be scaled down by a ratio of 2/8 to become a horizontal sub-block 322 having 2 pixel data, two downgrade operations may be performed on it and then the horizontal sub-block 322 having 2 pixel data can be obtained. As a horizontal sub-block 321 having 8 pixel data is to be scaled down by a ratio of 1/8 to become a horizontal sub-block 322 having one pixel datum, three downgrade operations may be performed on it and then the horizontal sub-block 322 having one pixel datum can be obtained.

Besides, those who are skilled in the art can utilize the current technique or the future technique to reduce the number of pixel data of a pixel block and thus it is not confined in the invention. According to one embodiment of the invention, as a horizontal sub-block 321 having 8 pixel data is to be scaled down by a ratio of 6/8 to become a horizontal sub-block 322 having 6 pixel data, the number of pixel data of the horizontal sub-block 321 can be scaled down by a ratio of 7/8 and then 6/7.

Figure 7:
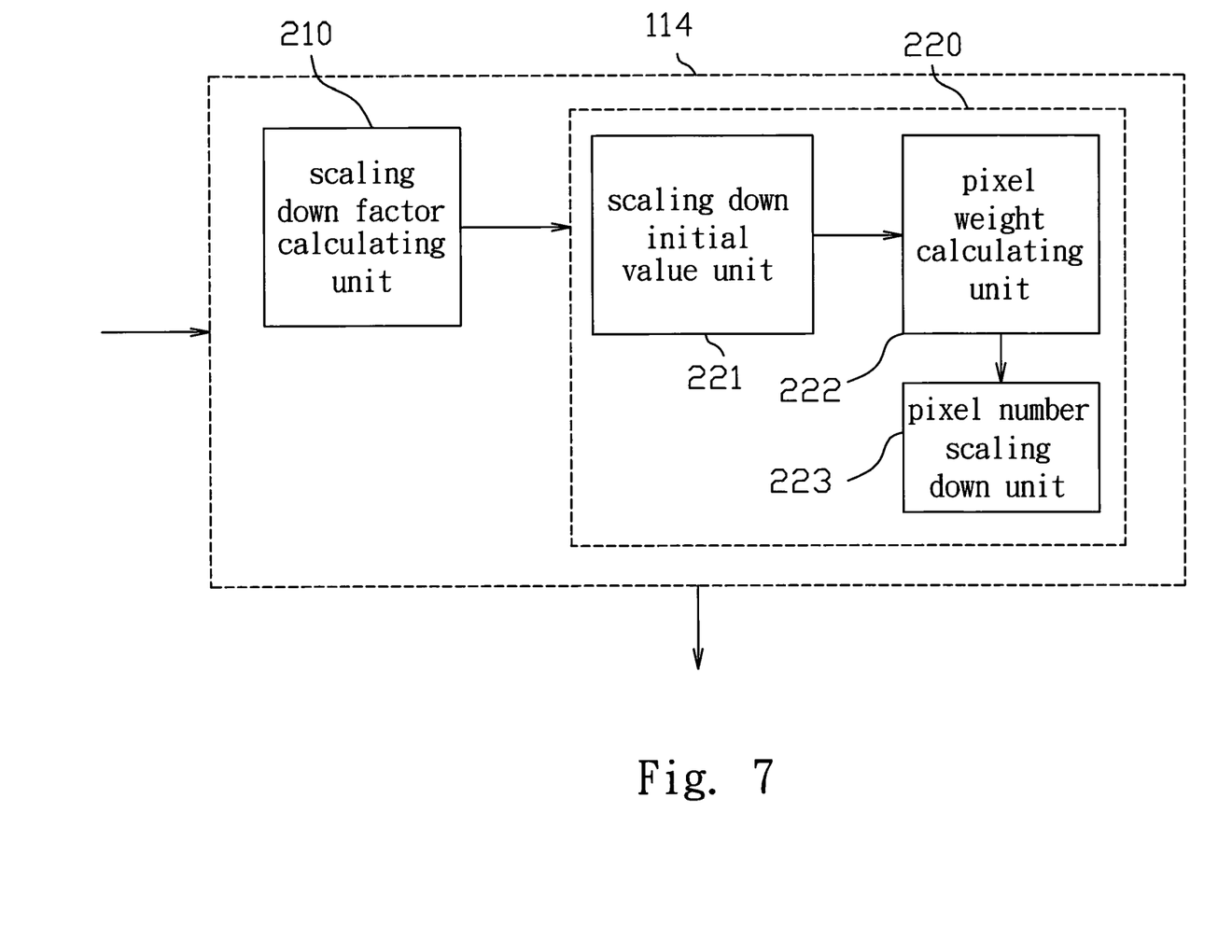
FIG. 7 shows a functional block diagram illustrating a scaling-down device of the image processing apparatus shown in FIG. 3 according to one embodiment of the invention.

FIG. 7 shows a functional block diagram illustrating a scaling-down device of the image processing apparatus shown in FIG. 3 according to one embodiment of the invention. As shown in FIG. 7, the scaling-down device 114 comprises a scaling down factor calculating unit 210 and a pixel number scaling down device 220. The scaling down factor calculating unit 210 determines a scaling down factor SDF and provides the scaling down factor SDF to the pixel number scaling down device 220 where the scaling down factor SDF equals m divided by n and n is a positive integer less than m. The pixel number scaling down device 220 calculates n number of processed pixel data in each sub-block by using the scaling down factor SDF and the m number of the non-processed pixel data of each sub-block wherein the combination of the n number of the processed pixel data of the sub-blocks corresponds to the image component. In one embodiment, the pixel number scaling down device 220 calculates one pixel datum of the n number of processed pixel data in each sub-block by using the scaling down factor SDF and two pixel data of the m number of the non-processed pixel data of each sub-block. In one embodiment, the pixel number scaling down device 220 comprises a scaling down initial value calculating unit 221, a pixel weight calculating unit 222, and a pixel number scaling down unit 223. The scaling down initial value calculating unit 221 calculates a scaling-down initial value SDI by using the scaling down factor SDF and provides the scaling-down initial value SDI to the pixel weight calculating unit 222. The pixel weight calculating unit 222 calculates a plurality of pixel weights by using the scaling down factor SDF and the scaling-down initial value SDI. The pixel number scaling down unit 223 calculates the n number of processed pixel data of each sub-block by using the pixel weights and the m number of the non-processed pixel data of each sub-block.

Figure 8:
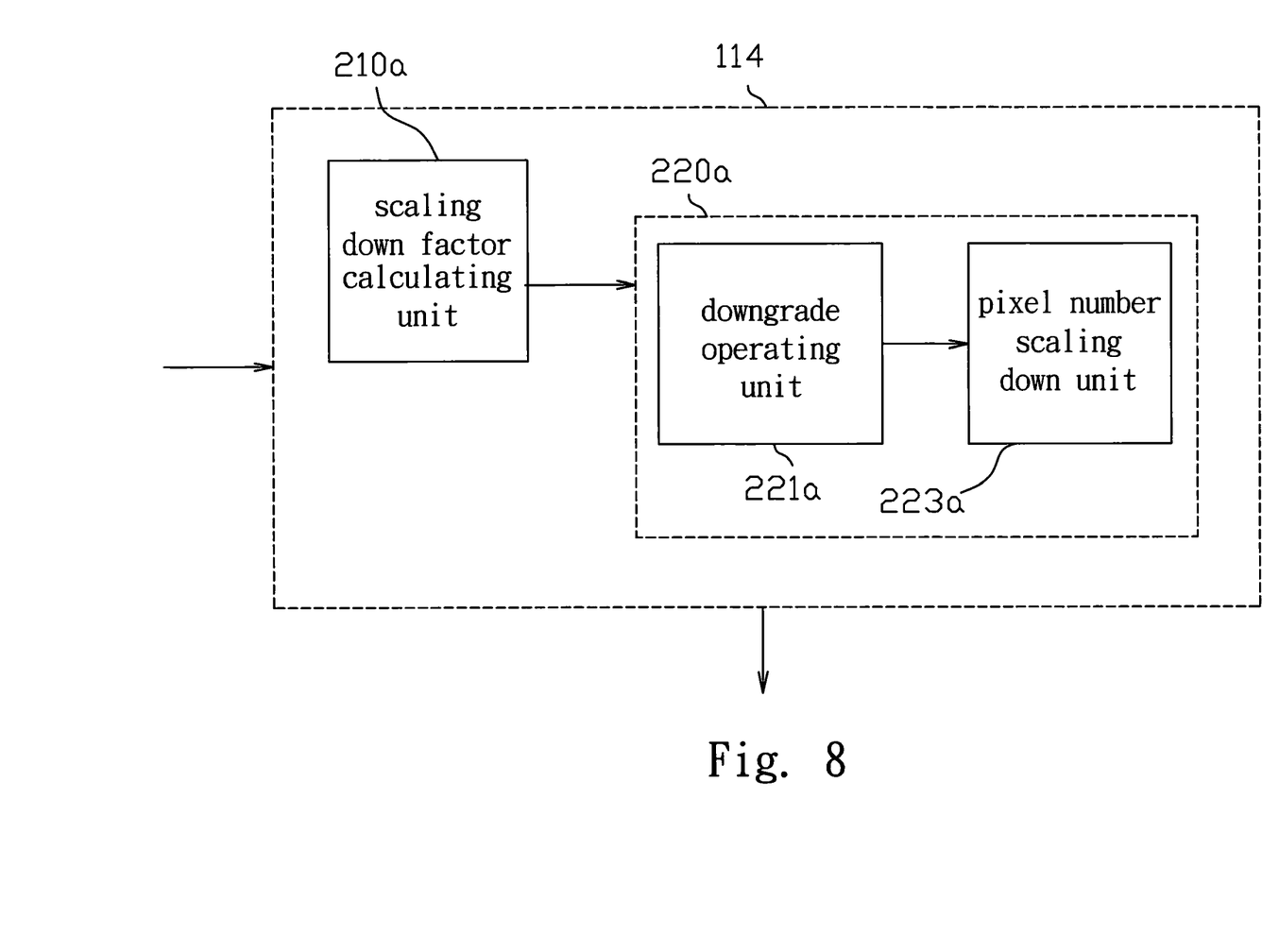
FIG. 8 shows a functional block diagram illustrating a scaling-down device of the image processing apparatus shown in FIG. 3 according to another embodiment of the invention.

FIG. 8 shows a functional block diagram illustrating a scaling-down device of the image processing apparatus shown in FIG. 3 according to another embodiment of the invention. The scaling-down device 114 comprises a scaling down factor calculating unit 210a and a pixel number scaling down device 220a. The scaling down factor calculating unit 210a determines a scaling down factor SDF where the scaling down factor SDF equals m divided by n and n is a positive integer less than m. As it is determined that m/2 is a positive integer and m divided by n is greater than 2, the scaling down factor SDF equals m divided by 2n. The pixel number scaling down device 220a comprises a downgrade operating unit 221a and a pixel number scaling down unit 223a. The downgrade operating unit 221a performs a downgrade operation on the m number of the non-processed pixel data of each sub-block to calculate m/2 number of temporary pixel data wherein the combination of the m/2 number of the temporary pixel data of the sub-blocks corresponds to the image component. The pixel number scaling down unit 223a calculates n number of processed pixel data in each sub-block by using the scaling down factor SDF and the m/2 number of temporary pixel data in each sub-block wherein the combination of the n number of processed pixel data of the sub-blocks corresponds to the image component.

In conclusion, according to the design in which the scaling down factor SDF is used in one embodiment of the invention, or it may be used together with the scaling down initial value SDI in another embodiment, during scaling down operation, only the pixel data in one pixel block are used and the pixel data in other pixel blocks are not used. For example, the pixel data crossing two pixel blocks are not used during scaling down operation. Therefore, according to an embodiment of the invention, the problem of using the pixel data crossing two pixel blocks does not exist and the optimum interpolation can be executed. Thus, the required capacity of the memory according to an embodiment of the invention is less than that in the prior art.

Although the preferred embodiments of the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. An image-scaling-down method for scaling down a pixel block of an image component wherein the pixel block comprises a plurality of sub-blocks, and each sub-block comprises m number of non-processed pixel data where m is a positive integer, the method comprising:
   determining a scaling down factor wherein m divided by n is the scaling down factor and n is a positive integer less than m; and
   calculating n number of processed pixel data in each sub-block by using the scaling down factor and the m number of the non-processed pixel data of each sub-block;
   wherein a combination of the n number of the processed pixel data of the sub-blocks corresponds to the image component;
   wherein the non-processed pixel data of the sub-blocks of the pixel block is arranged as an m×m matrix and each sub-block is one row or one column of the m×m matrix.

2. The method according to claim 1, wherein the step of calculating n number of processed pixels in each sub-block by using the scaling down factor and the m number of the non-processed pixel data of each sub-block comprises:
   calculating a scaling-down initial value by using the scaling down factor;
   calculating a plurality of pixel weights by using the scaling down factor and the scaling-down initial value; and
   calculating the n number of the processed pixel data in each sub-block by using the pixel weights and the m number of the non-processed pixel data of each sub-block.

3. The method according to claim 1, wherein the step of calculating n number of processed pixels in each sub-block by using the scaling down factor and the m number of the non-processed pixel data of each sub-block comprises: calculating one pixel datum of the n number of the processed pixel data in each sub-block by using the scaling down factor and two pixel data of the m number of the non-processed pixel data of each sub-block.

4. The method according to claim 1, wherein the step of calculating n number of processed pixel data in each sub-block by using the scaling down factor and the m number of the non-processed pixel data of each sub-block comprises:
   setting the scaling down factor to be m divided by 2n if it is determined that m/2 is a positive integer and m divided by n is greater than 2;
   performing a downgrade operation on the m number of the non-processed pixel data of each sub-block to calculate m/2 number of temporary pixel data wherein a combination of the m/2 number of the temporary pixel data of the sub-blocks corresponds to the image component; and
   calculating the n number of the processed pixel data in each sub-block by using the scaling down factor and the m/2 number of the temporary pixel data.

5. An image processing apparatus for processing an image component, the apparatus comprising:
   a storage device for storing the image component;
   an image decoder coupled to the storage device for decoding the image component and generating a pixel block corresponding to the image component, wherein the pixel block comprises a plurality of sub-blocks, and each sub-block comprises m number of non-processed pixel data where m is a positive integer; and
   a scaling-down device coupled to the image decoder, wherein the scaling-down device comprises:
   a scaling down factor calculating unit for determining a scaling down factor, wherein the scaling down factor equals m divided by n and n is a positive integer less than m; and
   a pixel number scaling down device for calculating n number of processed pixel data in each sub-block by using the scaling down factor and the m number of the non-processed pixel data of each sub-block, wherein a combination of the n number of the processed pixel data of the sub-blocks corresponds to the image component;
   wherein the non-processed pixel data of the sub-blocks of the pixel block are arranged as an m×m matrix and each sub-block is one row or one column of the m×m matrix.

6. The apparatus according to claim 5, wherein the pixel number scaling down device comprises:
   a scaling down initial value calculating unit for calculating a scaling-down initial value by using the scaling down factor;
   a pixel weight calculating unit for calculating a plurality of pixel weights by using the scaling down factor and the scaling-down initial value; and
   a pixel number scaling down unit for calculating the n number of the processed pixel data in each sub-block by using the pixel weights and the m number of the non-processed pixel data of each sub-block.

7. The apparatus according to claim 5, wherein the pixel number scaling down device calculates one pixel datum of the n number of the processed pixel data in each sub-block by using the scaling down factor and two pixel data of the m number of the non-processed pixel data of each sub-block.

8. The apparatus according to claim 5, wherein the scaling down factor calculating unit sets the scaling down factor to be m divided by 2n if it is determined that m/2 is a positive integer and m divided by n is greater than 2 and the pixel number scaling down device comprises:
   a downgrade operating unit for performing a downgrade operation on the m number of the non-processed pixel data of each sub-block to calculate m/2 number of temporary pixel data wherein the combination of the m/2 number of the temporary pixel data of the sub-blocks corresponds to the image component; and
   a pixel number scaling down unit for calculating the n number of the processed pixel data in each sub-block by using the scaling down factor and the m/2 number of the temporary pixel data, wherein the combination of the n number of the processed pixel data of the sub-blocks corresponds to the image component.

9. The apparatus according to claim 5, wherein the image decoder is a Joint Photographic Experts Group decoder or a Moving Picture Experts Group decoder.

10. An image-scaling-down method, applied in an image processing apparatus, for scaling down a pixel block of an image component, wherein the pixel block comprises a plurality of sub-blocks, and each sub-block comprises a plurality of non-processed pixel data that are arranged as an m1×m2 matrix where m1 and m2 are positive integers, the method comprising:
    determining a first scaling down factor and a second scaling down factor, wherein the first scaling down factor equals m1 divided by n1 that is a positive integer less than m1 and the second scaling down factor equals m2 divided by n2 that is a positive integer less than m2; and
    calculating a plurality of processed pixel data by using the scaling down factors and the non-processed pixel data, wherein the processed pixels are arranged as an 1×n2 matrix and the combination of the processed pixel data corresponds to the image component;

wherein each sub-block is one row or one column of the m1×m2 matrix.

11. The method according to claim 10, wherein the step of calculating a plurality of processed pixel data by using the scaling down factors and the non-processed pixel data comprises:

calculating n2 number of temporary pixel data of each row of an m1×n2 matrix by using the scaling down factors and the m2 number of the non-processed pixel data of each row of the m1×m2 matrix wherein the temporary pixel data of the rows corresponding to the m1×m2 matrix arc arranged as the m1×n2 matrix; and calculating the n1 number of the processed pixel data of each column of a n1×n2 matrix by using the scaling down factors and the m1 number of temporary pixel data of each column of the m1×n2 matrix wherein the processed pixel data are arranged as the n1×n2 matrix.

* * * * *